March 22, 1949.　　　　　S. E. WHITE　　　　　2,464,911

PENDULUM TYPE INCLINOMETER

Filed April 2, 1948　　　　　　　　　　　　　　2 Sheets-Sheet 1

INVENTOR.
Stanley E. White
BY
McMorrow, Berman & Davidson
ATTORNEYS

March 22, 1949.   S. E. WHITE   2,464,911
PENDULUM TYPE INCLINOMETER
Filed April 2, 1948   2 Sheets-Sheet 2
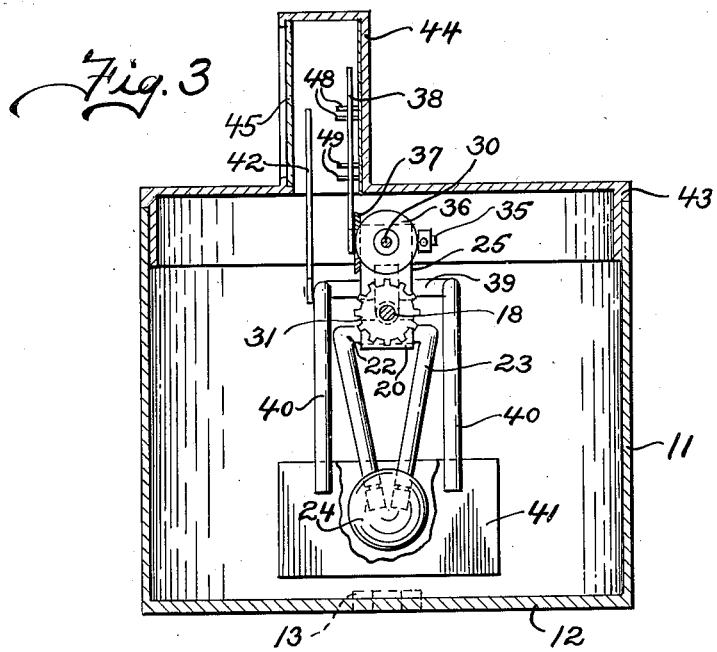
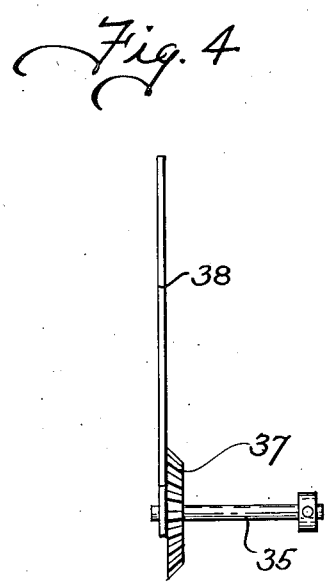
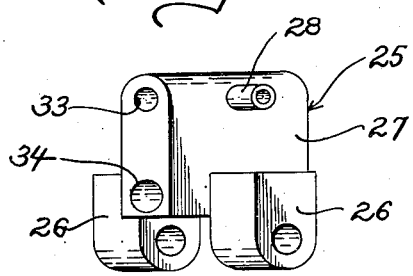
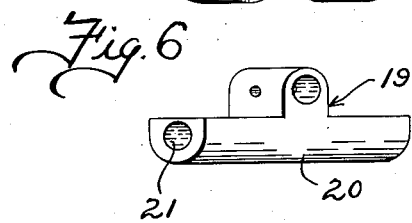
INVENTOR.
Stanley E. White.
BY
McMorrow, Berman & Davidson
ATTORNEYS Patented Mar. 22, 1949

2,464,911

UNITED STATES PATENT OFFICE 2,464,911

PENDULUM TYPE INCLINOMETER

Stanley E. White, Saratoga Springs, N. Y.

Application April 2, 1948, Serial No. 18,654

4 Claims. (Cl. 33—215.2)

This invention relates to automatic surveying devices and more particularly to a device suitable for use on farm tractors and various other machines for indicating ground inclination, for example, in such operations as irrigation farming and grading, airstrip leveling, preparing campsites during military operations, contour plowing, terracing, laying-out drainage ditches, road grading, grading athletic fields, grading parking lots, and the like.

A main object of the invention is to provide a novel and improved device for indicating the angle of inclination of a machine so as to warn the operator as to the danger of overturning the machine, or to otherwise inform the operator as to the lateral and longitudinal inclinations of the machine, said device being simple in construction, compact in size, and reliable in operation.

A further object of the invention is to provide an improved inclination measuring apparatus for use on tractors and other vehicles to inform the operator as to the pitch angle or the angle of lateral tilt of the vehicle, whereby the operator may be enabled to maintain the vehicle at a desired pitch angle and angle of lateral tilt, as in contour plowing, said apparatus being inexpensive to manufacture, rugged in construction and providing a steady indication not adversely affected by vibration or movement of the vehicle.

Further objects and advantages of the invention will become apparent from the following description and claims, and from the accompanying drawings, wherein:

Figure 3 is a vertical transverse cross-sectional view taken through the device of Figure 1.

Figure 4 is an enlarged detail view of the longitudinal pitch indicating arm and its supporting shaft as employed in the device of Figure 1.

Figure 5 is an enlarged perspective detail view of the bearing member which supports the swingable damping elements employed in the device of Figure 1.

Figure 6 is an enlarged perspective detail view of the bearing member which supports the swingable weight element employed in the device of Figure 1.

Figure 1:
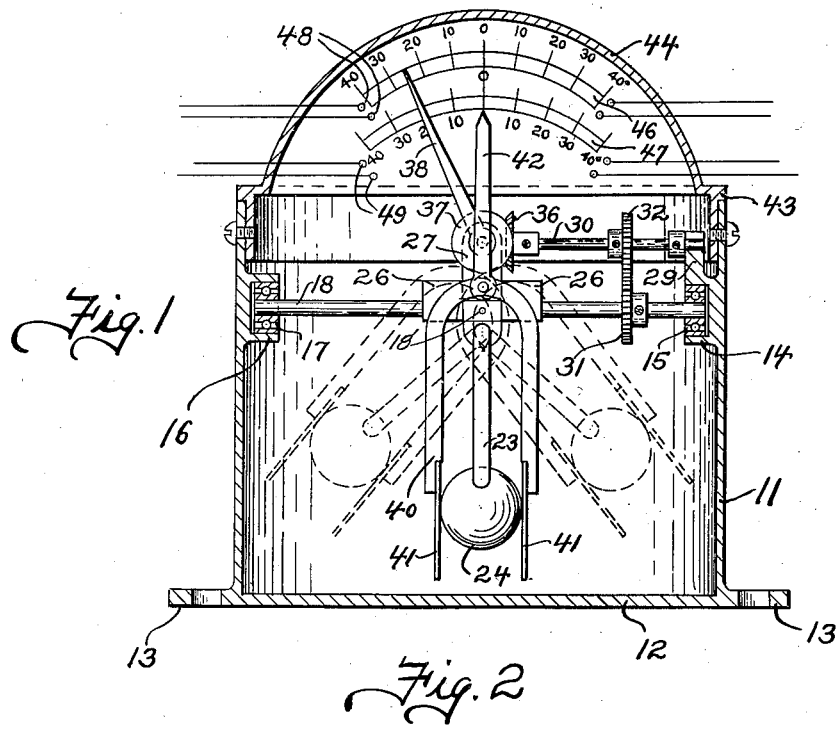
Figure 1 is a longitudinal vertical cross-sectional view taken through an inclination measuring device constructed in accordance with the present invention.
Figure 2:
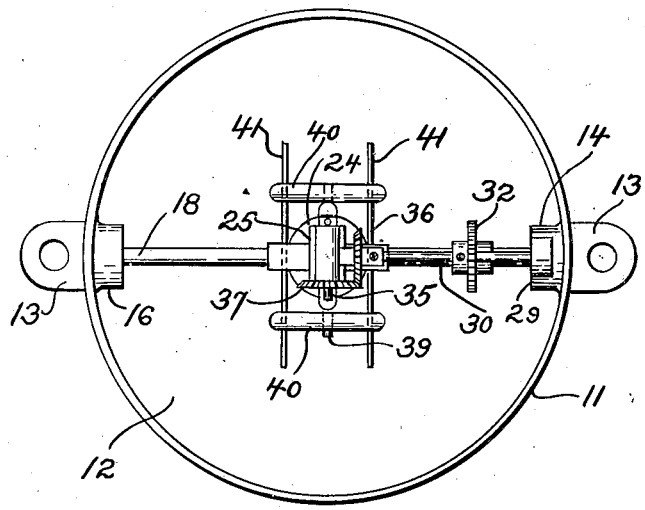
Figure 2 is a top plan view of the device of Figure 1 with the top cover and the indicating arms removed.

Referring to the drawings, 11 designates a generally cylindrical housing having a base portion 12 provided with diametrically opposed outwardly projecting apertured lugs 13, 13 for securing the housing in a vertical position to the forward portion of a tractor or other vehicle, within convenient view of the operator of the vehicle. Projecting inwardly from the upper portion of the wall of housing 11 is a lug 14 formed with a seat in which is positioned a ball bearing assembly 15. Diametrically opposed to lug 14 the housing wall is formed with a recessed boss 16 in which is seated a ball bearing assembly 17. Rotatably supported in said ball bearing assemblies 15 and 17 is a horizontal shaft 18.

Secured to the intermediate portion of shaft 18 by a pin 18' and depending therefrom is a support member 19 formed with a bottom arm 20 which extends in a vertical plane transverse to shaft 18 and is formed with a bore 21. Pivotally supported in bore 21 is the straight mid-portion 22 of an inverted U-shaped yoke member 23. Secured to the ends of the depending arms of yoke member 23 is a spherical weight 24. As shown in dotted view in Figure 1, weight 24 may swing around the pivot bore 21 responsive to the angling of shaft 18 in its own vertical plan when housing 11 is tilted in this plane. When the housing 11 is tilted in the plane of the yoke member 23, weight 24 also swings in said latter plane, causing shaft 18 to rotate in the bearing assemblies 15 and 17.

Designated at 25 is a support member formed with spaced depending apertured lugs 26, 26 which straddle the intermediate portion of member 19 and are rotatably mounted on shaft 18, the body portion of member 25 being designated at 27 and being located in the plane of yoke member 23 transverse to and above shaft 18. Projecting from the upper portion of body portion 27 at one side thereof is a bearing sleeve 28. Lug 14 is formed with a vertically projecting arm portion 29, and rotatably mounted in arm 29 and the bearing sleeve 28 is horizontal shaft 30. Shaft 18 carries a gear 31 which is in mesh with a similar gear 32 carried by shaft 30, so that shaft 30 is caused to rotate through the same angle as shaft 18 when weight 24 swings in the plane of yoke member 23.

Body portion 27 is formed with an upper longitudinal bore 33 and a lower longitudinal bore 34. Rotatably mounted in upper bore 33 is a shaft 35. Shaft 30 carries a bevel gear 36 which is in mesh with a similar bevel gear 37 carried by shaft 35. Secured to the end of shaft 35 adjacent bevel gear 37 is an upwardly extending pointer 38. When shaft 30 is caused to rotate as above described, its rotation is transmitted to shaft 35 through the bevel gears 36 and 37, causing the pointer 38 to swing through the same angle as weight 24 swings in the plane transverse to shaft 18.

Rotatably mounted in the lower bore 34 is a shaft 39 to the end portions of which are secured inverted U-brackets 40, 40. Secured to the arms of brackets 40, 40 at the sides of weight 24 are the damping vanes 41, 41, said vanes extending normally in planes transverse to shaft 18 and being swingable with the weight 24 around the axis of shaft 39, as shown in dotted view in Figure 1. Secured to the end of shaft 39 forwardly adjacent the pointer 38 is an upwardly extending pointer 42. Pointer 42 swings responsive to the swinging of weight 24 in the vertical plane of shaft 18.

Secured to the top of housing 11 is a cover 43 formed with an arcuate upwardly projecting intermediate portion 44 in which the upper portions of pointers 38 and 42 are received. The front wall of said arcuate cover portion comprises a transparent window 45 and the rear wall thereof is marked with respective angular scales 46 and 47. Scale 46 is associated with the pointer 38 and indicates the angular rotation of housing 11 in the plane transverse to shaft 18. Scale 47 is associated with the pointer 42 and indicates the angular rotation of housing 11 in the plane of shaft 18.

The housing 11 is substantially filled with oil, the oil level being preferably above the level of shaft 30 to provide lubrication for all the movable parts of the device as well as to damp the movement of said parts to reduce errors caused by vibration of the vehicle upon which the device is mounted.

At limiting positions at each end portion of the respective scales 46 and 47 the rear wall of the arcuate cover portion 44 carries inwardly projecting pairs of electrical contact pins 48, 48 and 49, 49 adapted to be bridged by the respective pointers 38 and 42 when the pointers are swung to positions corresponding to the safe limits of tilt of the vehicle on which the device is mounted. The contact pins 48, 48 and 49, 49 may be connected in suitable warning signal circuits or in circuits including relays for opening the vehicle ignition circuit when any pair of contact pins is bridged.

The device is preferably mounted on the vehicle with shaft 18 extending in the transverse direction of the vehicle. Pointer 38 then indicates on scale 46 the longitudinal angle of tilt of the vehicle and pointer 42 indicates on scale 47 the transverse angle of tilt of said vehicle.

While a specific embodiment of a device for indicating the inclination of a vehicle either in a longitudinal or a transverse direction has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A vehicle inclination indicator comprising a vertical housing, a first horizontal shaft journalled in said housing, a depending weight pivotally carried by said shaft, a support member rotatably mounted on said shaft, a second horizontal shaft journalled in said support member and the wall of the housing, means coupling said horizontal shafts for simultaneous rotation, a first pointer pivoted to said support member, means coupling said first pointer to said second horizontal shaft, a second pointer pivoted to said support member, and means for transmitting pivotal movement of said weight in the plane of said first shaft directly to said second pointer.

2. A vehicle inclination indicator comprising a vertical housing, a first horizontal shaft journalled in said housing, a depending weight pivoted to said shaft for rotation in the plane of said shaft, a support member rotatably mounted on said shaft, a second horizontal shaft journalled in said support member and the wall of the housing parallel to said first shaft, means coupling said shafts for simultaneous rotation, a first pointer pivoted to said support member for rotation in a plane parallel to said first shaft, means coupling said first pointer to said second shaft, a second pointer pivoted to said support member for rotation in a plane parallel to that of the first pointer, and means for transmitting swinging movement of the weight with respect to said first shaft directly to said second pointer, whereby the first pointer indicates tilting of the housing in a plane transverse to said first shaft and the second pointer indicates tilting of the housing in the plane of said first shaft.

3. A vehicle inclination indicator comprising a housing, a horizontal shaft journalled in said housing, a support member rotatably mounted on said shaft, means holding said support member in a fixed position in said housing, a weight depending from said shaft and pivoted thereto for swinging movement in the plane of said shaft, a first pointer pivoted to said support member, a second pointer pivoted to said support member on an axis parallel to that of the first pointer, means for transmitting rotary movement of said shaft with respect to the housing to said first pointer, and means for transmitting pivotal movement of said weight with respect to said shaft to said second pointer.

4. A vehicle inclination indicator comprising a vertical housing, a horizontal shaft journalled in said housing, a support member rotatably mounted on said shaft, means holding said support member in a fixed position in said housing, a weight depending from said shaft and pivoted thereto for swinging movement in the plane of the shaft, a first pointer pivoted to said support member for swinging movement in a plane parallel to the plane of said shaft, a second pointer pivoted to said support member on an axis parallel to that of the first pointer, means coupling the shaft to said first pointer to register tilting movement of the housing in a plane transverse to said shaft, means coupling said weight to said second pointer to register tilting movement of the housing in the plane of said shaft, and angle scales carried by the housing adjacent said pointers.

STANLEY E. WHITE.

No references cited.